United States Patent
Moskaluk et al.

(10) Patent No.: US 9,660,827 B2
(45) Date of Patent: May 23, 2017

(54) SYSTEM AND METHOD OF SWITCHING FROM MULTICAST TO UNICAST CALLS

(75) Inventors: Edward Moskaluk, Copley, OH (US); Kelly Schlueter, Wadsworth, OH (US)

(73) Assignee: Symbol Technologies, LLC, Holtsville, NY (US)

( * ) Notice: Subject to any disclaimer, the term of this patent is extended or adjusted under 35 U.S.C. 154(b) by 1389 days.

(21) Appl. No.: 11/755,457

(22) Filed: May 30, 2007

(65) Prior Publication Data

US 2008/0170570 A1 Jul. 17, 2008

Related U.S. Application Data

(60) Provisional application No. 60/884,722, filed on Jan. 12, 2007.

(51) Int. Cl.
| | |
|---|---|
| *H04L 12/18* | (2006.01) |
| *H04W 76/00* | (2009.01) |
| *H04W 8/26* | (2009.01) |
| *H04W 28/14* | (2009.01) |
| *H04W 76/02* | (2009.01) |
| *H04L 29/06* | (2006.01) |

(52) U.S. Cl.
CPC ........ *H04L 12/189* (2013.01); *H04L 65/1069* (2013.01); *H04L 65/1086* (2013.01); *H04W 76/005* (2013.01); *H04L 12/1813* (2013.01); *H04L 65/4076* (2013.01); *H04W 8/26* (2013.01); *H04W 28/14* (2013.01); *H04W 76/02* (2013.01)

(58) Field of Classification Search
None
See application file for complete search history.

(56) References Cited

U.S. PATENT DOCUMENTS

| | | | | | |
|---|---|---|---|---|---|
| 4,924,456 | A | * | 5/1990 | Maxwell et al. | 370/296 |
| 5,450,618 | A | * | 9/1995 | Naddell et al. | 370/296 |
| 5,825,755 | A | * | 10/1998 | Thompson et al. | 370/296 |
| 6,603,761 | B1 | * | 8/2003 | Wang et al. | 370/352 |
| 7,912,070 | B1 | * | 3/2011 | Choksi | 370/277 |

(Continued)

FOREIGN PATENT DOCUMENTS

| | | |
|---|---|---|
| EP | 626592 A1 | 2/2006 |
| EP | 1626542 | 2/2006 |

(Continued)

OTHER PUBLICATIONS

International Search Report and the Written Opinion of the International Searching Authority for PCT/US2008/050366 mailed Apr. 29, 2008.

(Continued)

*Primary Examiner* — Chirag Shah
*Assistant Examiner* — Joshua Smith

(57) ABSTRACT

Described is a communication device which includes a receiver receiving a multicast communication including audio data and identification data identifying an initiator of the multicast communication, a memory, an audio output, a processor processing the multicast communication, sending the processed audio data to the audio output to be played to a user, sending the identification data to the memory to be stored and initiating a unicast communication with the initiator based on the identification data and a transmitter transmitting the unicast communication to the initiator.

18 Claims, 8 Drawing Sheets

(56) References Cited

U.S. PATENT DOCUMENTS

| | | |
|---|---|---|
| 2002/0044534 A1* | 4/2002 | Cohen .................... 370/263 |
| 2003/0008674 A1* | 1/2003 | Cudak et al. ............. 455/466 |
| 2004/0022204 A1* | 2/2004 | Trembley ................. 370/285 |
| 2004/0228292 A1* | 11/2004 | Edwards ................. 370/277 |
| 2004/0258007 A1* | 12/2004 | Nam et al. ............... 370/310 |
| 2005/0031109 A1* | 2/2005 | Fernandez et al. ........ 370/260 |
| 2005/0099946 A1* | 5/2005 | Ito et al. .................. 370/230 |
| 2005/0102522 A1* | 5/2005 | Kanda .................... 713/176 |
| 2005/0181815 A1* | 8/2005 | Shostak ................... 455/519 |
| 2005/0207360 A1* | 9/2005 | Costo et al. .............. 370/282 |
| 2005/0214728 A1* | 9/2005 | Kikuchi et al. .......... 434/307 R |
| 2005/0251438 A1* | 11/2005 | Tseng et al. .............. 705/10 |
| 2006/0023649 A1* | 2/2006 | Tillet et al. .............. 370/310 |
| 2006/0035630 A1* | 2/2006 | Morishima et al. ....... 455/416 |
| 2006/0056320 A1* | 3/2006 | Gatts ...................... 370/276 |
| 2006/0098591 A1* | 5/2006 | Katou ..................... 370/260 |
| 2006/0120308 A1* | 6/2006 | Forbes et al. ............. 370/260 |
| 2006/0153102 A1* | 7/2006 | Kuure et al. ............. 370/263 |
| 2006/0172754 A1* | 8/2006 | Shin et al. ............... 455/518 |
| 2006/0223459 A1* | 10/2006 | Maggenti ................ 455/90.2 |
| 2006/0256734 A1* | 11/2006 | Erhart et al. ............. 370/254 |
| 2006/0280132 A1* | 12/2006 | Connor ................... 370/276 |
| 2007/0054625 A1* | 3/2007 | Beale ...................... 455/69 |
| 2007/0104191 A1* | 5/2007 | Jeon et al. ............... 370/389 |
| 2007/0183349 A1* | 8/2007 | Pannell et al. ............ 370/276 |
| 2007/0217347 A1* | 9/2007 | Leitgeb et al. ........... 370/263 |
| 2007/0232277 A1* | 10/2007 | Spalink ................... 455/414.1 |
| 2007/0254692 A1* | 11/2007 | McCoy .................... 455/553.1 |
| 2008/0123572 A1* | 5/2008 | Nemori .................... 370/296 |
| 2008/0124697 A1* | 5/2008 | Pacchioli et al. .......... 434/350 |

FOREIGN PATENT DOCUMENTS

| | | |
|---|---|---|
| EP | 1626592 | 2/2006 |
| EP | 1718086 | 11/2006 |
| WO | 2006/110322 | 10/2006 |
| WO | 2006110322 A | 10/2006 |
| WO | WO2008/088957 | 7/2008 |

OTHER PUBLICATIONS

International Preliminary Report on Patentability dated Jul. 23, 2009 in related case PCT/US2008/050366.
International Preliminary on Patentability and the Written Opinion of the International Searching Authority for International Application No. PCT/US2008/020366 mailed Jul. 23, 2009.
European Office Action for European Application No. 08705737.8 dated Dec. 8, 2009, a foreign counterpart.

* cited by examiner

SYSTEM AND METHOD OF SWITCHING FROM MULTICAST TO UNICAST CALLS

PRIORITY CLAIM

This application claims the priority to the U.S. Provisional Application Ser. No. 60/884,722, entitled "System and Method of Switching from Multicast to Unicast Calls," filed Jan. 12, 2007. The specification of the above-identified application is incorporated in its entirety herewith by reference

FIELD OF INVENTION

The present invention related to a system and method of switching from multicast to unicast calls.

BACKGROUND

A wireless mobile device may operate as a digital walkie-talkie over Internet Protocol (IP) and/or Voice Over Internet Protocol (VOIP). The digital walkie-talkie over IP operates on the basis of a half duplex communication system where, although two-way communication may be performed, only one party may send a signal at a time. A half duplex communication is multicast over a communication network so that one party may transmit the same signal to a plurality of recipients.

A VOIP communication utilizes a full duplex system, which is unicast so signals are only sent to a single destination, thereby increasing communication privacy. Wireless mobile devices are now equipped with the option to be able to communicate using both half duplex and full duplex communication systems.

SUMMARY OF THE INVENTION

A method for receiving a multicast communication including data identifying an initiator of the multicast communication, storing the data identifying the initiator and initiating a unicast communication with the initiator using the data identifying the initiator.

A communication device having a receiver receiving a multicast communication including audio data and identification data identifying an initiator of the multicast communication, a memory, an audio output, a processor processing the multicast communication, sending the processed audio data to the audio output to be played to a user, sending the identification data to the memory to be stored and initiating a unicast communication with the initiator based on the identification data and a transmitter transmitting the unicast communication to the initiator.

A method for receiving a multicast communication including audio data and identification data identifying an initiator of the multicast communication, processing the identification data and forwarding the audio data to a plurality of devices.

BRIEF DESCRIPTION OF THE DRAWINGS

The accompanying drawings, which are incorporated in and constitute a part of this specification, illustrate several embodiments of the invention and, together with the description, serve to explain the principles of the invention. In the drawings.

DETAILED DESCRIPTION

The present invention may be further understood with reference to the following description and the appended drawings. The present invention provides a method and system for facilitating the transition from half duplex to full duplex communications by the users of wireless mobile devices (e.g., a cell phone, a personal digital assistant, a walkie-talkie, a two-way radio, a data acquisition device, etc.). The exemplary embodiment may be implemented with either a single or a plurality of servers and/or routers and/or or any other type of network device that may perform the features of the server described herein.

The exemplary embodiments of the present invention utilize a user-friendly interface allowing mobile device users the option to switch from half duplex to full duplex communications with a minimal use of controls. In doing so, the exemplary embodiments employ a walkie-talkie transmission log to record incoming half-duplex communications on a mobile device. As will be described more fully below, the exemplary embodiments provide a number of methods by which the walkie-talkie transmission log is created and also a number of methods by which the walkie-talkie transmission log is retained on and/or relayed to the wireless mobile device(s).

A mobile device may operate as a digital walkie-talkie over Internet Protocol (IP) and/or Voice Over Internet Protocol (VOIP). The digital walkie-talkie over IP may operate on the basis of a half duplex communication system where, although two-way communication may be performed, only one party may send a signal at a time. Once a party begins receiving a signal, it must wait for the transmitter to stop transmitting before replying. A half duplex communication is multicast over a communication network so that one party may transmit the same signal to a plurality of recipients belonging to a particular multicast group. For example, an audio signal being sent to a particular multicast group may be multicast to every individual belonging to the group.

A VOIP communication utilizes a full duplex system, which allows simultaneous communication in both directions. The VOIP communication is unicast so signals are only sent to a single destination. A user may desire to switch from a half duplex to a full duplex communication system to increase communication privacy. Both of the aforementioned systems operate using the same basic infrastructure (e.g., both send digital signals through a server). However, those skilled in the art will understand that there are many different types of infrastructures that support these types of voice communications. As such, mobile devices are equipped with the option to be able to communicate using both half duplex and full duplex communication systems.

Figure 1:
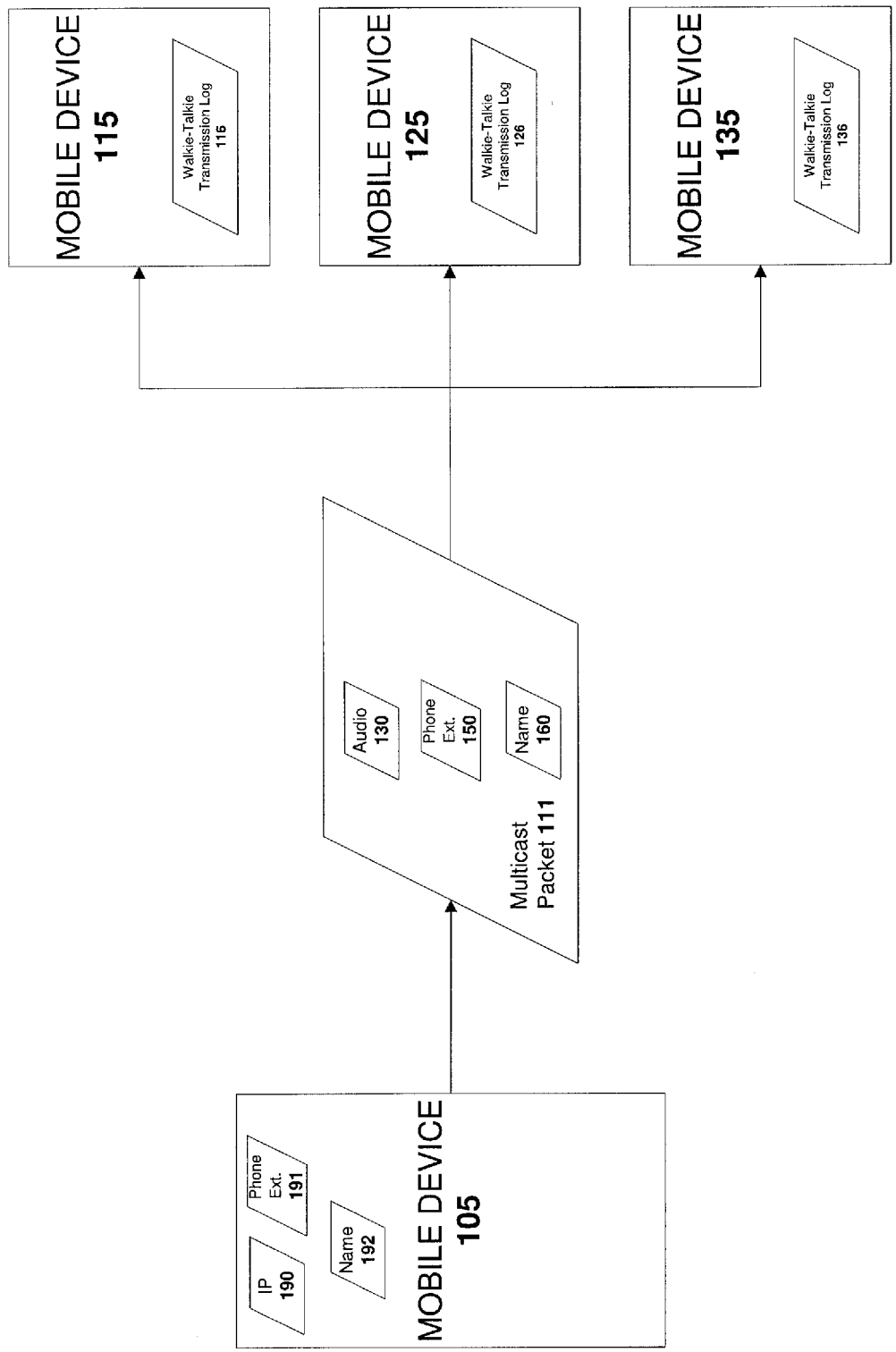
FIG. 1 shows a first exemplary system for placement of a unicast call according to an exemplary embodiment of the present invention.

FIG. 1 shows a first system according to an exemplary embodiment of the present invention. Initially, a mobile device 105 may begin a half duplex communication using the walkie-talkie feature to multicast audio data 130 to a plurality of receivers 115, 125 and 135. When the mobile device 105 multicasts the audio signal 130, the phone extension 150 and the name 160 associated with the mobile device 105 may also be included in the transmission. Those skilled in the art will understand that, as this is a digital walkie-talkie over IP system, the aforementioned data (e.g., audio signal 130, phone extension 150 and name 160) may be embedded in a multicast packet 111. When the mobile devices 115, 125 and 135 receive the multicast transmission, they may output the audio data 130 via a speaker. The phone extension 150 and the name 160 associated with the mobile device that transmitted the information (e.g., mobile device 105) may be cached. The mobile devices 115, 125 and 135 may have any type of volatile and/or non-volatile memory to store or cache the data. The data may be stored, for example, in a database in the form of the walkie-talkie transmission logs 116, 126 and 136 for mobile devices 115, 125 and 135, respectively. The walkie-talkie transmission logs 116, 126 and 136 may be a list of received data from different multicast transmissions. These lists may include a certain predefined number of previously received transmissions or may include previously received transmissions for a predetermined period of time.

Thus, when the users of mobile device 115, 125 or 135 desire to call the mobile device 105 using a full duplex communication, the walkie-talkie transmission logs 116, 126 and 136, respectively, may be used to simplify this transition. For example, because the walkie-talkie transmission log 116 has the phone extension 150 and name 160 information for the recently received multicast transmissions, the mobile device 115 may allow quick access to this walkie-talkie transmission log 116 to quickly place the full duplex call to the mobile device 105.

Figure 2:
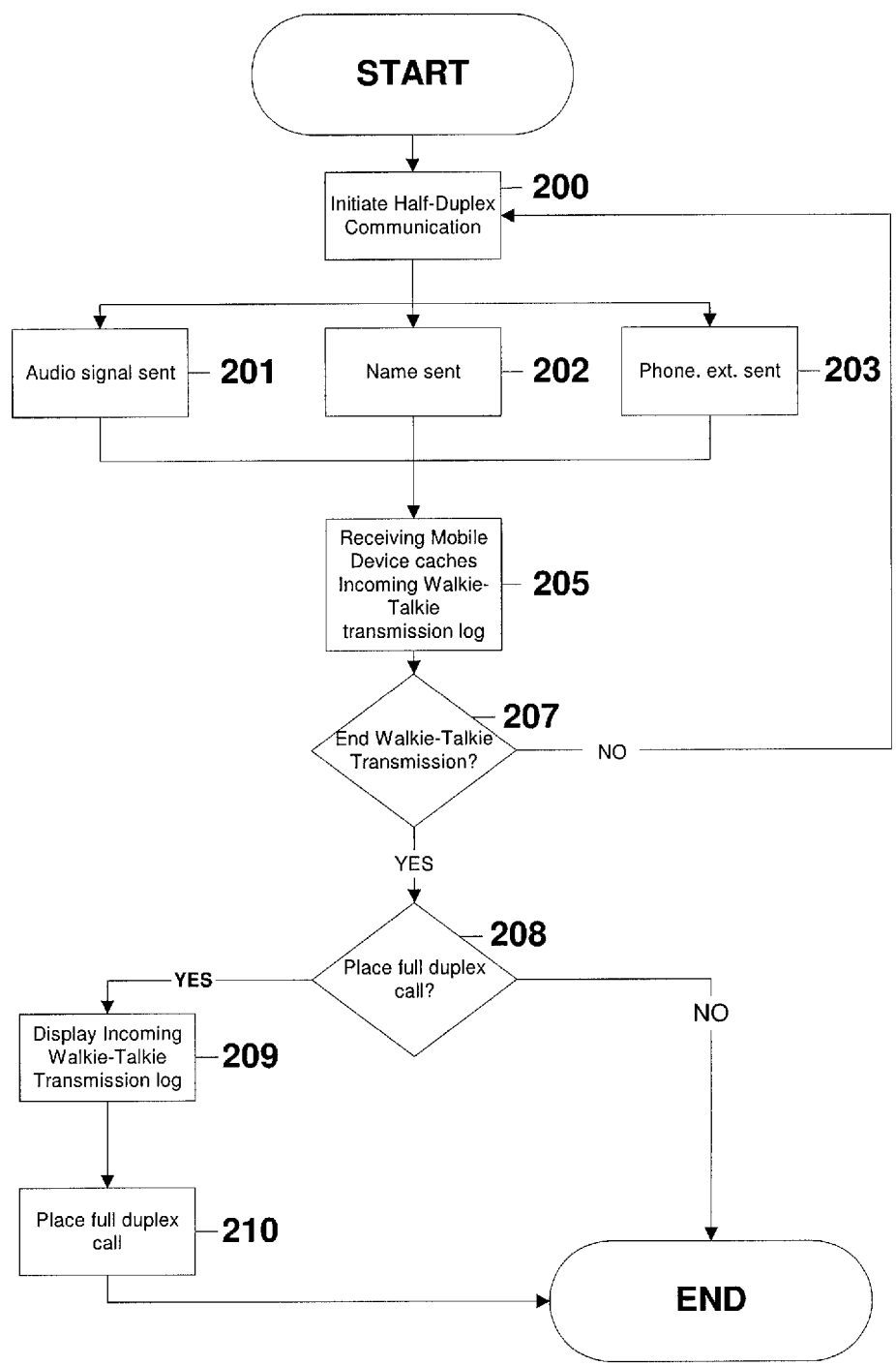
FIG. 2 shows a first exemplary method for the first system of FIG. 1 according to the present invention.

FIG. 2 shows a first exemplary method of the first system of FIG. 1. The method of FIG. 2 will be described with reference to the system of FIG. 1. In step 200, the mobile device 105 initiates a half duplex communication to a plurality of receiving mobile devices. In steps 201-203, data included in the half duplex communication is sent to the plurality of receiving devices. The data includes the audio signal 130 (step 201), the name 160 (step 202) and the phone extension 150 (step 203).

In step 205, the receiving mobile devices, including mobile devices 115, 125 and 135 cache the non-audio data (e.g., name 160 and phone extension 150) into respective walkie-talkie transmission logs 116, 126 and 136.

In step 207, if half duplex walkie-talkie transmissions continue to be made, the process will loop back to step 200 where the steps 200-205 will be performed for each walkie-talkie transmission. Those skilled in the art will understand that if a receiving device receives multiple transmissions from the same transmitting device, i.e., the same phone number and name data in successive transmissions, the receiving device may not store each instance of the data in the walkie-talkie transmission log.

If the walkie-talkie transmission is ended in step 207, the method continues to step 208 to determine if the user desires to place a full duplex call. If no call is made, the process ends with the data stored in the walkie-talkie transmission log for further use. However, if the user desires to make a full duplex call, the mobile devices 115, 125 or 135 may display the walkie-talkie transmission log in step 209. From these walkie-talkie transmission logs, a selection may be made based on the name and/or the phone number to place the full duplex call in step 210.

The walkie-talkie transmission logs may be displayed on the mobile device in various manners. For example, a user interface of the mobile device may include a callback selection button (hard or soft key). When the callback function is selected, the mobile device may display the walkie-talkie transmission log in a list form, allowing the user to scroll through the list in reverse chronological order and select the other user to call. In another exemplary embodiment, the walkie-talkie transmission logs may be selectable from the same initial menu. In yet another exemplary embodiment, each time a multicast transmission is received, the mobile device may display the data (e.g., phone number, name, etc.) with a list of options such as place a call to this user, cancel, show other recently received walkie-talkie communications, etc.

Figure 3:
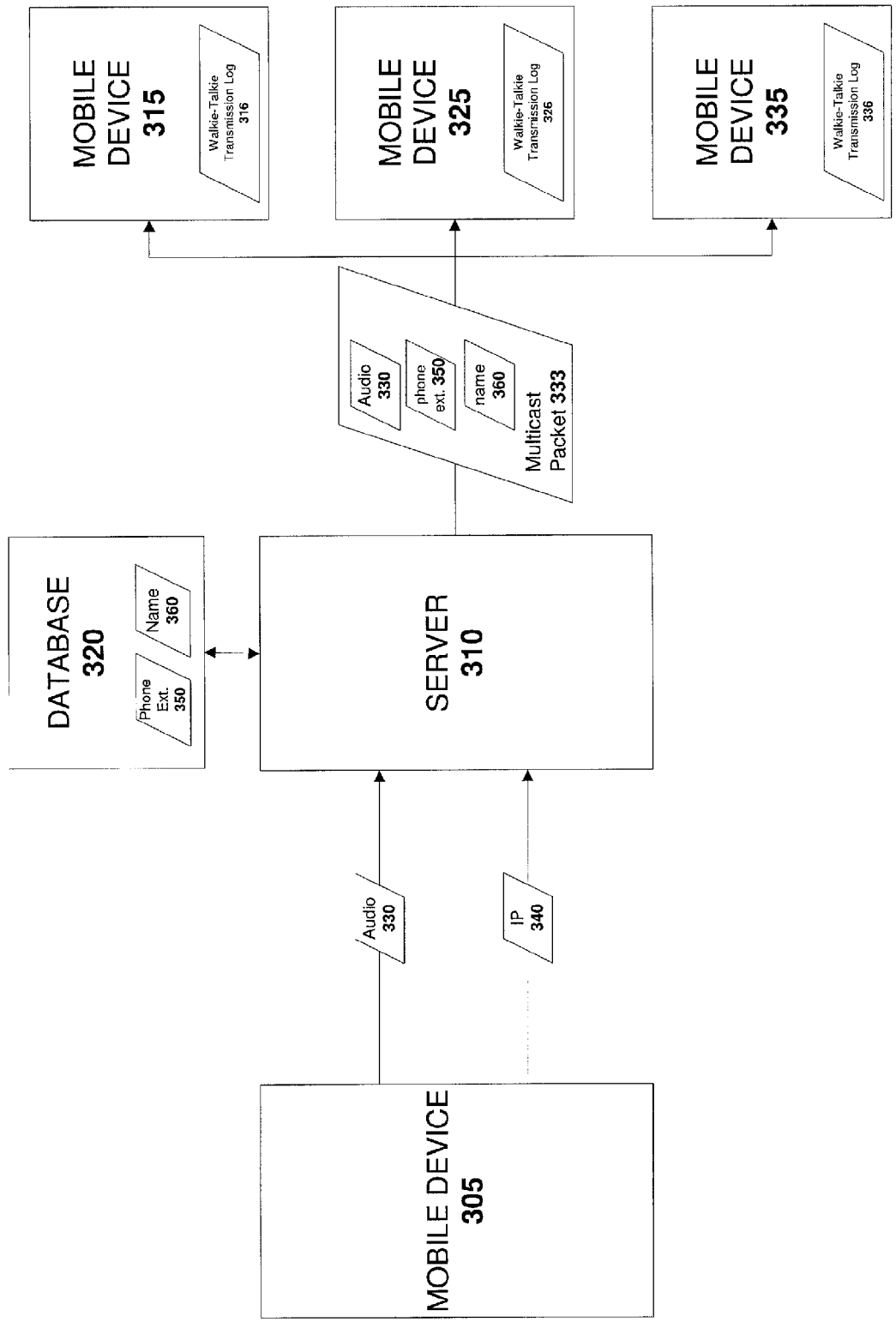
FIG. 3 shows a second exemplary system for placement of a unicast call according to second exemplary embodiment of the present invention.

FIG. 3 shows a second exemplary system according to an exemplary embodiment of the present invention. As with the above-described exemplary embodiment, the mobile device 305 may initiate a half duplex communication using the walkie-talkie feature to a plurality of receivers. This communication may be processed and/or routed via a server 310 (or any other type of network device that may perform the features of the server described below). The multicast transmission from the mobile device 305 may include the audio signal 330 and the IP address 340 of the mobile device 305. The server 310 may include a database 320 that may include a correlation of phone extensions 350 and/or names 360 with IP addresses 340. Those skilled in the art will understand that using a database to store the correlation is only exemplary. Other storage mechanisms, for example, tables, arrays, etc., may also be used. Thus, when the server 310 receives the multicast communication from mobile device 305 having the audio signal 330 and the IP address 340, the server 310 may look-up the correlation in the database 320. The server 310 may then insert the corresponding phone extension 350 and/or name 360 into the multicast packets 333 that are forwarded to the members of the multicast group, including mobile devices 315, 325 and 335. The multicast transmission leaving the server 310 will include the audio signal 330, the phone extension 350 and/or the name 360. When received by the mobile devices 315, 325 and 335, the phone extension 350 and the name 360 may be cached in the walkie-talkie transmission logs 316, 326 and 336. The walkie-talkie transmission logs 316, 326 and 336 may be used in the same manner as described above for the walkie-talkie transmission logs 106, 116, 126 and 136 as described with reference to FIGS. 1-2.

Figure 4:
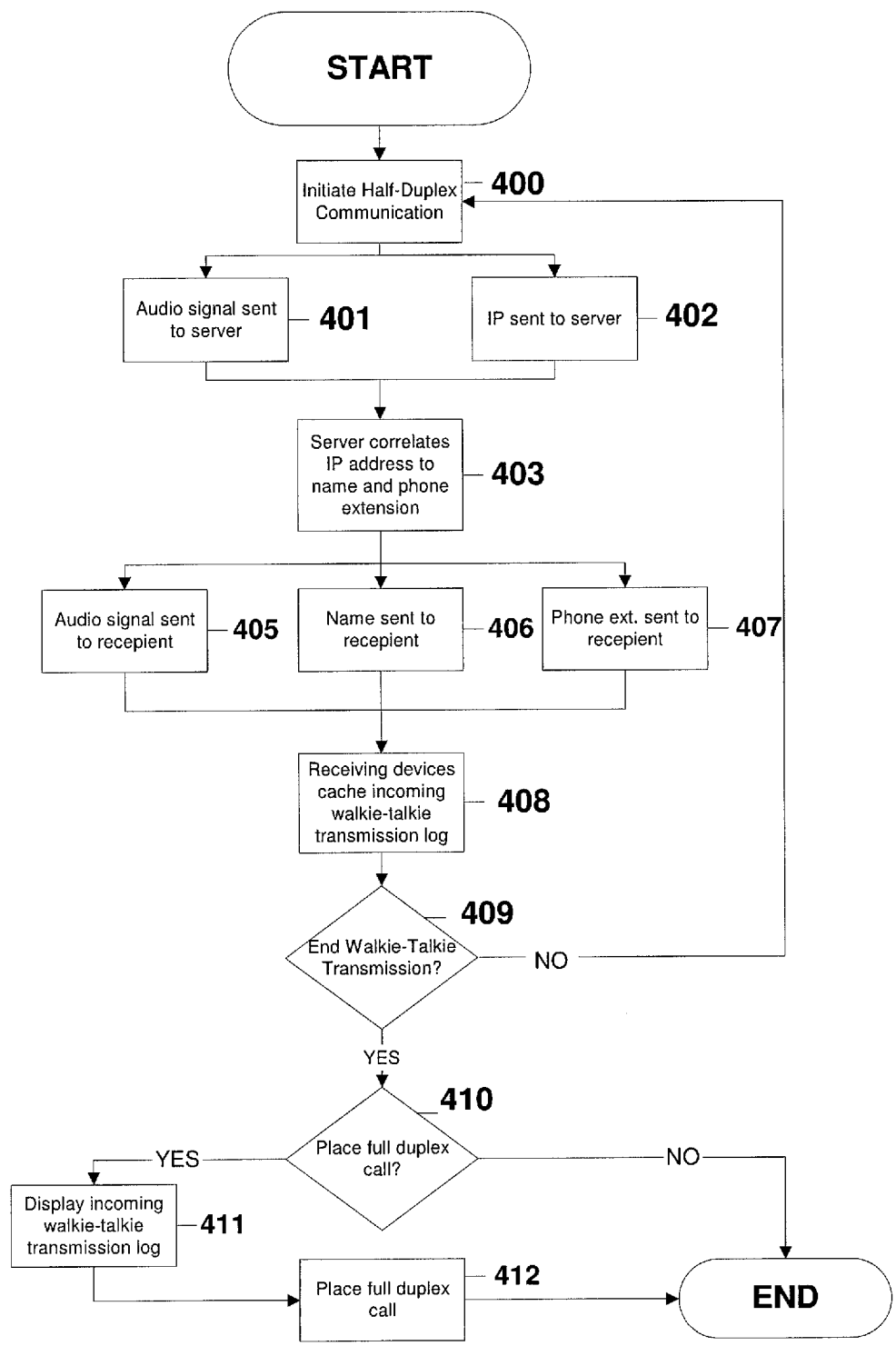
FIG. 4 shows a second exemplary method for the second system of FIG. 3 according to the present invention

FIG. 4 shows a second exemplary method for the system of FIG. 3. The method of FIG. 4 will be described with reference to the system of FIG. 3. In step 400, the mobile device 305 initiates a half duplex communication to a plurality of receiving mobile devices. In steps 401-402, data for the half duplex communication is sent to the server. The data includes the audio signal 330 (step 401) and the IP address 340 (step 402) for mobile device 305.

In step 403, the server 310 correlates the received IP address 340 to the name 360 and/or phone extension 350 using the database 320. The server 310 then transmits this information, along with the audio signal 330, to the multicast recipients in steps 405-407. The transmitted data includes the audio signal 330 (step 405), the name 360 (step 406) and the phone extension 350 (step 407). The aforementioned data may be sent as part of a multicast data packet 333.

In step 408, the receiving mobile devices may cache the received non-audio data into walkie-talkie transmission logs 316, 326 and 336. In step 409, if half duplex walkie-talkie transmissions continue to be made, the process will loop back to step 400 where the steps 400-408 will be performed for each walkie-talkie transmission. Those skilled in the art will understand that if a receiving device receives multiple transmissions from the same transmitting device, i.e., the same phone number and name data in successive transmissions, the receiving device may not store each instance of the data in the walkie-talkie transmission log. For example, if a mobile device has the memory capacity to record only a predetermined number of transmissions, wherein newer transmissions replace older transmissions in chronological order, multiple transmissions from the same user may not override transmissions from other users.

If the walkie-talkie transmission is ended in step 409, the method continues to step 410 to determine if the user desires to place a full duplex call. If no call is made, the process ends with the data stored in the walkie-talkie transmission log for further use. However, if the user desires to make a full duplex call, the mobile devices 315, 325 or 335 may display the walkie-talkie transmission logs 316, 326 and 336 respectively in step 411. The user of the mobile device may then reference the name and/or the phone extension included therein to place the full duplex call in step 412.

Figure 5:
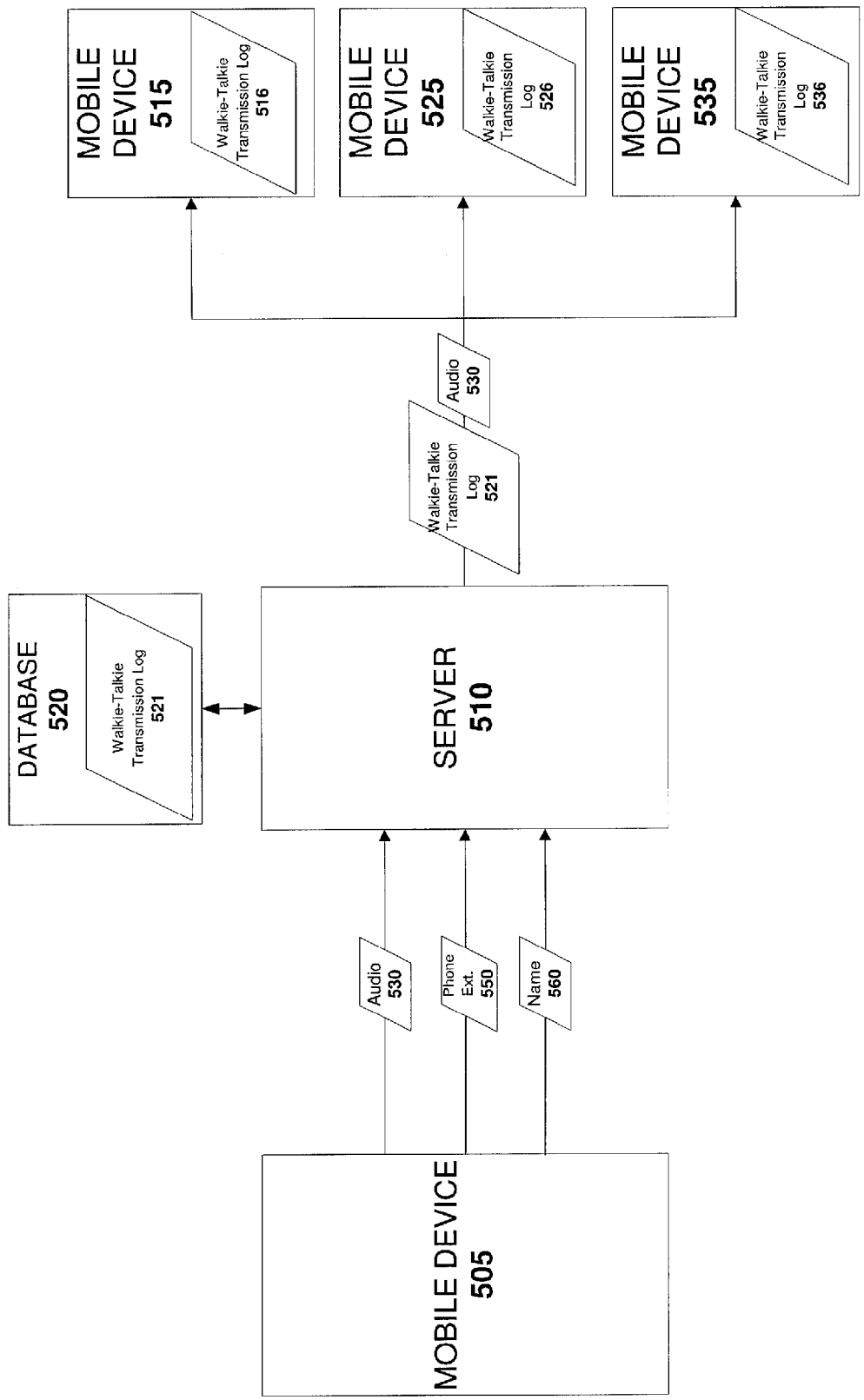
FIG. 5 shows a third exemplary system for placement of a unicast call according to a third exemplary embodiment of the present invention.

FIG. 5 shows a third exemplary system according to an exemplary embodiment of the present invention. As with the above-described exemplary embodiments, the mobile device 505 may initiate a half duplex communication using the walkie-talkie feature. This communication may be processed and/or routed via a server 510 (or any other type of network device that may perform the features of the server described below).

In the exemplary embodiment of FIG. 3 noted above, the server 310 may include a database that includes a correlation of phone extensions and/or names with IP addresses so a correlation may be made for the phone extensions and/or names for each of the multicast transmissions. In the exemplary embodiment of FIG. 5, the multicast transmission from the mobile device 505 includes the audio signal 530, the phone extension data 550 and/or the name 560. Thus, in this exemplary embodiment, the server 510 would not require the correlation database because the phone extension 550 and name 560 would be included in the multicast transmission.

Additionally, the server 510 may store the information concerning the multicast transmission (e.g., phone extension 550 and name 560) as a group-specific walkie-talkie transmission log 521 in the database 520. As additional transmissions are sent to the multicast group in question, the server 510 may store this data to the walkie-talkie transmission log 521 in the database 520. The database 520 may store all half duplex audio transmissions across a network according to the multicast group being transmitted to. The server 510 may then forward audio data 530 and the walkie-talkie transmission log 521 to the mobile devices 515, 525 and 535 that are the recipients in the particular multicast group. The mobile devices 515, 525 and 535 may then cache the data from the walkie-talkie transmissions log 521 internally as walkie-talkie transmission logs 516, 526 and 536, respectively. Those skilled in the art will understand that the server 510 may not send the entire log after every transmission, but may merely send an update to indicate the last transmission to each multicast group. The walkie-talkie transmission logs 516, 526 and 536 may be used in the same manner as described above for the walkie-talkie transmission logs 116, 126 and 136 as described with reference to FIGS. 1-2.

Figure 6:
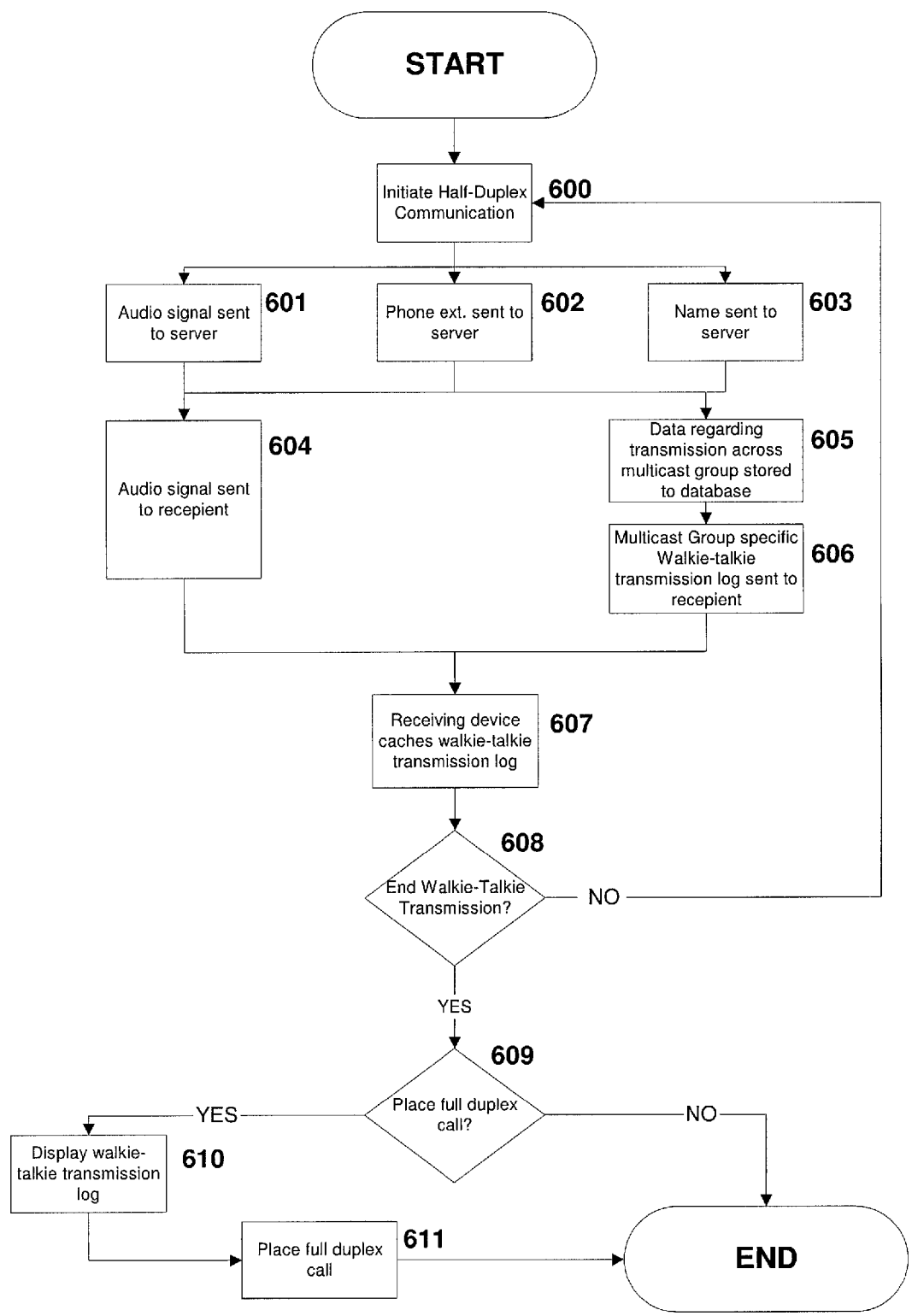
FIG. 6 shows a third exemplary method for the third system of FIG. 5 according to the present invention.

FIG. 6 shows a third exemplary method for the third system of FIG. 5. The method of FIG. 6 will be described with reference to the system of FIG. 5. In step 600, the mobile device 505 initiates a half duplex communication to a plurality of receiving mobile devices. In steps 601-603, data for the half duplex communication is sent to the server. The data includes the audio signal 530 (step 601), phone extension 550 (step 602) and name 560 (step 603) for mobile device 505.

In step 604, the audio signal is sent to the receiving devices 515, 525 and 535. At the same time, the database 520 retains a log of the transmissions sent to a particular multicast group (step 605). Once this data has been saved, the database 520 enables the server 510 to transmit the data for the walkie-talkie transmission logs 516, 526 and 536 to the receiving mobile devices 515, 525 and 535 respectively (step 606). In step 607, the receiving mobile devices may cache the data received for the walkie-talkie transmission logs 516, 526 and 536.

In step 608, if half duplex walkie-talkie transmissions continue to be made, the process will loop back to step 600 where the steps 600-607 will be performed for each walkie-talkie transmission. Those skilled in the art will understand that if a receiving device receives multiple transmissions from the same transmitting device, i.e., the same phone number and name data in successive transmissions, the receiving device may not store each instance of the data in the walkie-talkie transmission log.

Conversely, if the walkie-talkie transmission is ended in step 608, the method continues to step 609 to determine if the user desires to place a full duplex call. If no call is made, the process ends with the data stored in the walkie-talkie transmission log for further use. However, if the user desires to make a full duplex call, the mobile devices 515, 525 or 535 may display the walkie-talkie transmission logs 516, 526 and 536 respectively in step 610. The users may place the full duplex call in step 611 by selecting the name 560 and/or the phone extension 550 of the recipient.

It should be noted that this exemplary embodiment may also incorporate the correlation database as discussed above with reference to FIG. 3. It will be apparent to those skilled in the art as to how to implement the correlation database based on the above description of this exemplary embodiment and the correlation database.

Figure 7:
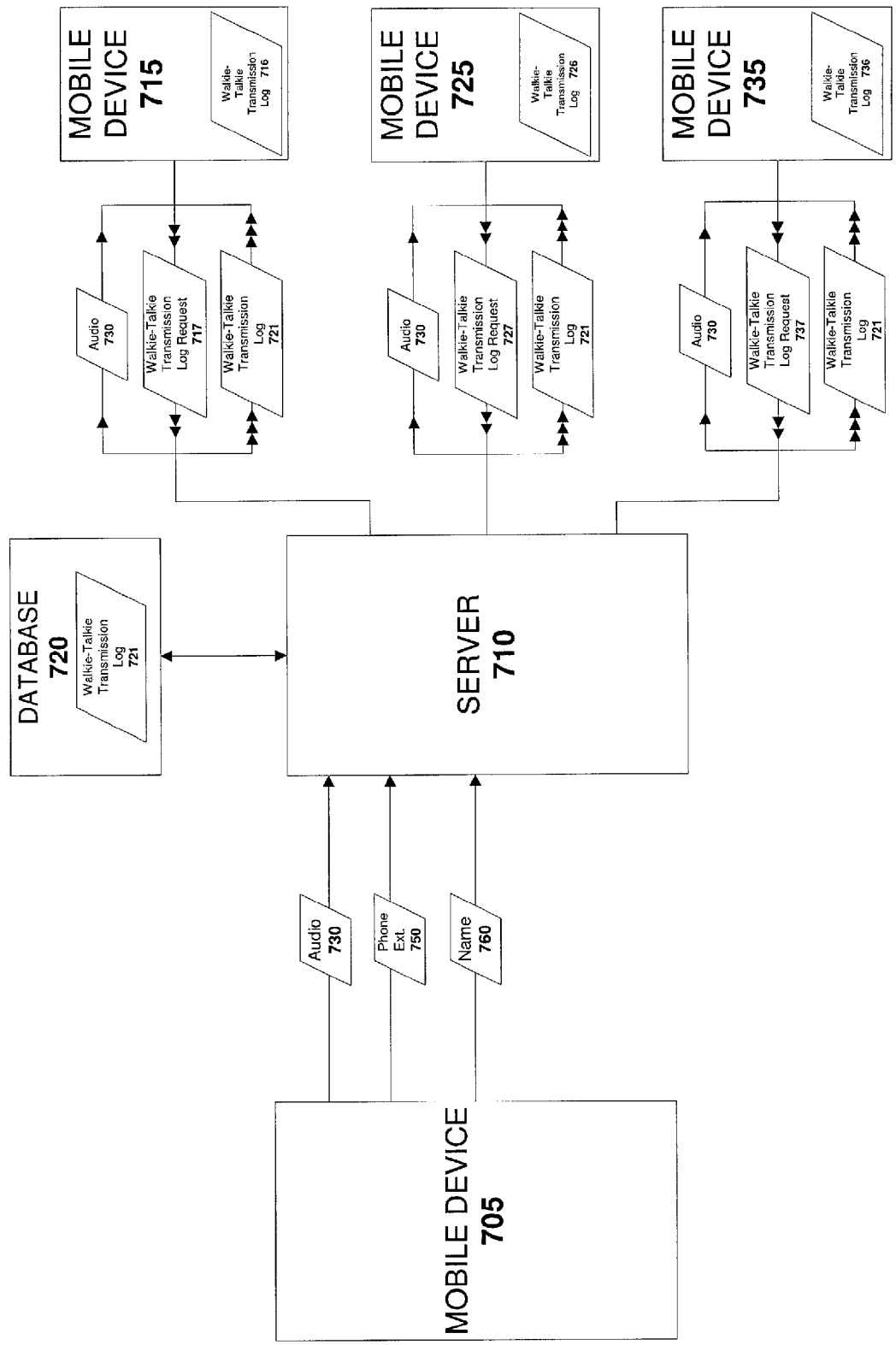
FIG. 7 shows a fourth exemplary system for placement of a unicast call according to a fourth exemplary embodiment of the present invention.

FIG. 7 shows a fourth exemplary system according to an exemplary embodiment of the present invention. The embodiment of FIG. 7 may operate in the same manner as the embodiment described with respect to FIG. 5. The difference is that, in this embodiment, the server 710 will not send the walkie-talkie transmission logs 716, 726 and 736 to the mobile devices 715, 725 and 735, respectively, until requested to do so. Once the audio signal 730 is sent to the server 710 along with the phone extension 750 and the name 760 of the mobile device 705, the database may record the aforementioned non-audio data in a multicast group specific walkie-talkie transmission log 721. After receipt of the audio signal 730, the mobile device 715, 725 or 735 may send a transmission log request 717, 727 or 737, respectively, to the server 710 requesting the walkie-talkie transmission log for a particular multicast group. This transmission log requests 717, 727 and 737 may be sent via a plurality of options, e.g., by selecting a callback option on the mobile device 715, 725 or 735, via a text message prompt sent by a mobile device, via selection of a log request option which may automatically be displayed upon termination of a half-duplex transmission, etc. After receiving the request, the server 710 may retrieve the multicast group specific walkie-talkie transmission log 721 from the database 720 and send the walkie-talkie transmission log 721 to the mobile device 715, 725 and 735. The mobile devices 715, 725 and 735 may then cache the received data into respective walkie-talkie transmission logs 716, 726 and 736, which may be used in the same manner as described above for the walkie-talkie transmission logs 116, 126 and 136 as described with reference to FIGS. 1-2.

Figure 8:
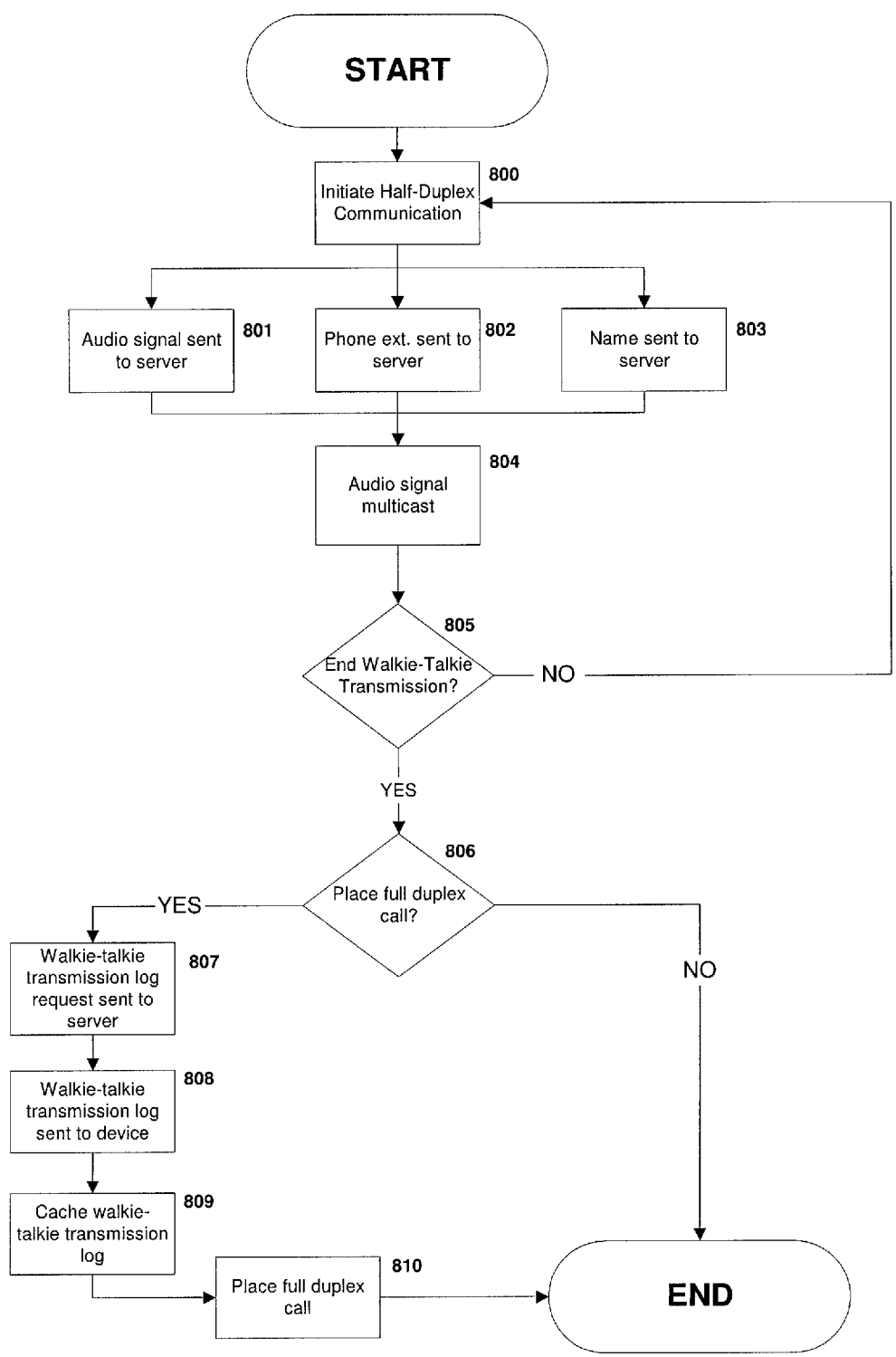
FIG. 8 shows a fourth exemplary method for the fourth system of FIG. 7 according to the present invention.

FIG. 8 shows an exemplary method for the system of FIG. 7. The method of FIG. 8 will be described with reference to the system of FIG. 7. In step 800, the mobile device 705 initiates a half duplex communication to a plurality of receiving mobile devices. In steps 801-803, data for the half duplex communication is sent to the server. The data includes the audio signal 730 (step 801, phone extension 750 (step 802) and name 760 (step 803) for mobile device 705.

In step 804, the audio signal is multicast to the receiving devices 715, 725 and 735. In step 805, if half duplex walkie-talkie transmissions continue to be made, the process will loop back to step 800 where the steps 800-805 will be performed for each walkie-talkie transmission.

Conversely, if the walkie-talkie transmission is ended in step 805, the method continues to step 806 to determine if the user desires to place a full duplex call. If no call is made, the process ends. However, if a full duplex call is to be placed at a later time to a recent half-duplex transmission recipient, the mobile device may be directed to steps 807-810, as detailed below.

If the user desires to make a full duplex call, the mobile devices 715, 725 or 735 may send walkie-talkie transmission logs requests 717, 727 and 737 respectively in step 807. Upon receipt of these requests, the server 710 may transmit the walkie-talkie transmission log 721 to the mobile devices 715, 725 and 735 (step 808). Upon receipt, the receiving mobile devices 715, 725 and 735 may cache the walkie-talkie transmission log 721. The mobile devices 715, 725 and 735 may now reference their respective walkie-talkie transmission logs 716, 726 and 736 to place the full duplex call in step 811.

In yet another exemplary embodiment, the server may listen to all walkie-talkie multicast groups and record the device that initiates the transmissions, thereby creating a walkie-talkie transmission log for each multicast group. The devices may then request multicast group logs from the server on an as-needed basis.

Those skilled in the art will understand that the described exemplary embodiments of the present invention may be altered without departing from the spirit or scope of the invention. Thus, it is to be understood that these embodiments have been described in an exemplary manner and are not intended to limit the scope of the invention which is intended to cover all modifications and variations of this invention that come within the scope of the appended claims and their equivalents.

What is claimed is:

1. A method, comprising:
    multicasting audio data from an initiator to a plurality of mobile devices over Internet Protocol with a half duplex multicast communication to allow the same audio data be sent to the plurality of mobile devices;
    receiving the half duplex multicast communication with the plurality of mobile devices including data identifying the initiator of the half duplex multicast communication with the data identifying the initiator being originated from the initiator;
    storing the data identifying the initiator of the half duplex multicast communication in each of the plurality of mobile devices with the data identifying the initiator being extracted from the half duplex multicast communication; and
    initiating a full duplex communication unicasted between a first of the plurality of mobile devices and the initiator of the half duplex multicast communication by selecting the initiator of the half duplex multicast communication from the received data identifying the initiator of the half duplex multicast communication stored in the first mobile device with an action of a user of the first mobile device acted upon one of the data displayed on the first mobile device.

2. The method according to claim 1, wherein the data identifying the initiator of the half duplex multicast communication includes one of a phone extension of the initiator, a name of the initiator and an IP address of a device used by the initiator.

3. The method according to claim 1, wherein the data is stored in a transmission log.

4. The method according to claim 3, wherein initiating the full duplex communication includes:
    selecting at least a portion of the data from the transmission log.

5. The method according to claim 1, further comprising:
    receiving additional half duplex multicast communications with the plurality of mobile devices including additional data identifying another initiator of the additional half duplex multicast communications;
    storing the additional data identifying the another initiator of the additional half duplex multicast communications; and
    initiating another full duplex communication to one of the initiator of the half duplex multicast communication and the another initiator of the additional half duplex multicast communications based on one of the data and the additional data.

6. The method according to claim 1, further comprising:
    displaying a prompt and a soft-key after receiving the data, wherein selecting one of the data, the prompt and the soft-key initiates the full duplex communication.

7. A communication device, comprising:
    a receiver receiving a half duplex multicast communication including audio data that is multicased from an initiator to a plurality of mobile devices over Internet Protocol to allow the same audio data be sent to the plurality of mobile devices, and the half duplex multicast communication further including identification data identifying the initiator of the half duplex multicast communication with the data identifying the initiator being originated from the initiator;
    a memory storing the identification data identifying the initiator of the half duplex multicast communication with the identification data being extracted from the half duplex multicast communication;
    an audio output playing the audio data to a user;
    a processor processing the half duplex multicast communication, sending the processed audio data to the audio output, sending the identification data identifying the initiator of the half duplex multicast communication to the memory and initiating a full duplex communication unicasted to the initiator of the half duplex multicast communication by selecting the initiator of the half duplex multicast communication from the received identification data identifying the initiator of the half duplex multicast communication stored in the memory with an action of the user of a first mobile device acted upon one of the data displayed on the first mobile device; and a transmitter transmitting the full duplex communication to the initiator of the half duplex multicast communication.

8. The device according to claim 7, wherein the identification data identifying the initiator of the half duplex multicast communication includes one of a phone extension of the initiator, a name of the initiator and an IP address of a device used by the initiator.

9. The device according to claim 7, wherein the receiver receives the half duplex multicast communications as a series of multicast packets.

10. The device according to claim 7, further comprising:
a display, a prompt and a soft-key after the half duplex multicast communication is processed by the processor, wherein selecting one of the prompt and the soft-key sends a signal to the processor to initiate the full duplex communication.

11. The device according to claim 7, wherein the device is one of a cell phone, a personal digital assistant, a walkie-talkie, a two-way radio, and a data acquisition device.

12. The device according to claim 7, further comprising:
a hard key sending a signal to the processor to initiate the full duplex communication.

13. A method, comprising:
multicasting audio data from an initiator to a plurality of mobile devices over Internet Protocol with a half duplex multicast communication to allow the same audio data be sent to the plurality of mobile devices;
receiving the half duplex multicast communication with the plurality of mobile devices including audio data and identification data identifying the initiator of the half duplex multicast communication with the identification data being originated from the initiator;
storing the identification data identifying the initiator of the half duplex multicast communication in each of the plurality of mobile devices with the identification data being extracted from the half duplex multicast communication;
outputting the audio data to an audio output in each of the plurality of mobile devices; and
initiating a full duplex communication unicasted between a first of the plurality of mobile devices and the initiator of the half duplex multicast communication by selecting the initiator of the half duplex multicast communication from the received identification data identifying the initiator of the half duplex multicast communication stored in the first mobile device with an action of a user of the first mobile device acted upon one of the data displayed on the first mobile device.

14. The method according to claim 13, further comprising:
forwarding altered identification data identifying the initiator of the half duplex multicast communication with the audio data to the plurality of mobile devices.

15. The method according to claim 14, wherein the altered identification data identifying the initiator of the half duplex multicast communication is an IP address of the initiator of the half duplex multicast communication and selecting the initiator of the half duplex multicast communication includes:
comparing the IP address to stored data; and
extracting one of a name and a phone extension from the stored data based on the IP address, wherein the one of the name and the phone extension is the altered identification data identifying the initiator of the half duplex multicast communication.

16. The method according to claim 13, further comprising storing the data in a transmission log.

17. The method according to claim 16, further comprising forwarding the transmission log with the audio data to the plurality of mobile devices.

18. The method according to claim 16, further comprising:
receiving a request for the transmission log from one of the plurality of mobile devices; and
sending the transmission log to the one of the mobile devices.

* * * * *